United States Patent
Pipard et al.

(10) Patent No.: US 11,649,522 B2
(45) Date of Patent: May 16, 2023

(54) ZINC-COATED STEEL SHEET WITH HIGH RESISTANCE SPOT WELDABILITY

(71) Applicant: ArcelorMittal, Luxembourg (LU)

(72) Inventors: Jean-Marc Pipard, Vaux (FR); Sebastien Cremel, Feves (FR); Anirban Chakraborty, Chesterton, IN (US); Damon Panahi, Chicago, IL (US); Olga Girina, Munster, IN (US); Hassan Ghassemi-Armaki, Highland, IN (US); Pavan Challa Venkata Surya, Highland, IN (US); Yacine Benlatreche, Maizières-leès-Metz (FR)

(73) Assignee: ArcelorMittal, Luxembourg (LU)

( * ) Notice: Subject to any disclaimer, the term of this patent is extended or adjusted under 35 U.S.C. 154(b) by 594 days.

(21) Appl. No.: 16/614,734

(22) PCT Filed: Jun. 13, 2018

(86) PCT No.: PCT/IB2018/054306
§ 371 (c)(1),
(2) Date: Nov. 18, 2019

(87) PCT Pub. No.: WO2018/234938
PCT Pub. Date: Dec. 27, 2018

(65) Prior Publication Data
US 2020/0181729 A1 Jun. 11, 2020

(30) Foreign Application Priority Data
Jun. 20, 2017 (WO) .................. PCT/IB2017/000753

(51) Int. Cl.
C21D 9/50 (2006.01)
C21D 8/02 (2006.01)
(Continued)

(52) U.S. Cl.
CPC ............... *C21D 9/50* (2013.01); *B23K 11/115* (2013.01); *B23K 11/163* (2013.01);
(Continued)

(58) Field of Classification Search
CPC ................ B23K 11/115; B23K 11/163; B23K 2101/006; B23K 2103/04; B23K 31/125; B23K 37/0408; C21D 1/20; C21D 1/22; C21D 1/76; C21D 2211/001; C21D 2211/002; C21D 2211/008; C21D 6/002; C21D 6/005; C21D 6/008; C21D 8/0205; C21D 8/0236; C21D 8/0247; C21D 9/46; C21D 9/50; C22C 38/02; C22C 38/04; C22C 38/06; C22C 38/18; C22C 38/20; C22C 38/22; C22C 38/24; C22C 38/28; C22C 38/32; C22C 38/34; C22C 38/38; C22C 38/56; C22C 38/58; C23C 2/02;
(Continued)

(56) References Cited

U.S. PATENT DOCUMENTS 6,558,815 B1 5/2003 Suzuki et al.
2009/0107588 A1 4/2009 Allain
(Continued)

FOREIGN PATENT DOCUMENTS

CN 101336308 A 12/2008
CN 102639739 A 8/2012
(Continued)

OTHER PUBLICATIONS

ISR of PCT/IB2018/054306, dated Sep. 21, 2018.
IPR of PCT/IB2018/054306, dated Sep. 10, 2019.
D. Huin, P. Flauder, J.B. Leblond, "Numerical simulation of internal oxidation of steels during annealing treatments" Oxidation of Metals 2005;64;1:131-67.
JANAF Thermomechanical Tables, 3rd Edition, Part II, Journal of Physical and Chemical Reference Data, vol. 14, 1985, supplement n°1, published by American Chemical Society and the American Institute of Physics for the National Bureau of Standards.

*Primary Examiner* — Jenny R Wu
(74) *Attorney, Agent, or Firm* — Davidson, Davidson & Kappel, LLC

(57) ABSTRACT

A method for producing a zinc or zinc-alloy coated steel sheet with a tensile strength higher than 900 MPa, for the fabrication of resistance spot welds containing in average not more than two Liquid Metal Embrittlement cracks per weld having a depth of 100 μm or more, with steps of providing a cold-rolled steel sheet, heating cold-rolled steel sheet up to a temperature T1 between 550° C. and Ac1+50° C. in a furnace zone with an atmosphere (A1) containing from 2 to 15% hydrogen by volume, so that the iron is not oxidized, then adding in the furnace atmosphere, water steam or oxygen with an injection flow rate Q higher than $(0.07\%/h \times \alpha)$, $\alpha$ being equal to 1 if said element is water steam or equal to 0.52 if said element is oxygen, at a temperature T≥T1, so to obtain an atmosphere (A2) with a dew point DP2 between −15° C. and the temperature Te of the iron/iron oxide equilibrium dew point, then heating the sheet from temperature $T_1$ up to a temperature $T_2$ between 720° C. and 1000° C. in a furnace zone under an atmosphere (A2) of nitrogen containing from 2 to 15% hydrogen and more than 0.1% CO by volume, with an oxygen partial pressure higher than $10^{-21}$ atm., wherein the duration $t_D$ of heating of the sheet from temperature $T_1$ up to the end of soaking at temperature $T_2$ is between 100 and 500 s., soaking the sheet at $T_2$, then cooling the sheet at a rate between 10 and 400° C./s, then coating the sheet with zinc or zinc-alloy coating.

13 Claims, No Drawings

(51) Int. Cl.

| | | |
|---|---|---|
| *C21D 6/00* | (2006.01) | |
| *C22C 38/38* | (2006.01) | |
| *C22C 38/22* | (2006.01) | |
| *C22C 38/06* | (2006.01) | |
| *C22C 38/02* | (2006.01) | |
| *C21D 9/46* | (2006.01) | |
| *C21D 1/76* | (2006.01) | |
| *C23C 2/02* | (2006.01) | |
| *C23C 2/40* | (2006.01) | |
| *C25D 5/36* | (2006.01) | |
| *C23F 17/00* | (2006.01) | |
| *B23K 11/11* | (2006.01) | |
| *B23K 31/12* | (2006.01) | |
| *B23K 11/16* | (2006.01) | |
| *B23K 37/04* | (2006.01) | |
| *B23K 103/04* | (2006.01) | |
| *B23K 101/00* | (2006.01) | |
| *C23C 2/06* | (2006.01) | |
| *C25D 3/22* | (2006.01) | |

(52) U.S. Cl.
CPC ........ *B23K 31/125* (2013.01); *B23K 37/0408* (2013.01); *C21D 1/76* (2013.01); *C21D 6/002* (2013.01); *C21D 6/005* (2013.01); *C21D 6/008* (2013.01); *C21D 8/0205* (2013.01); *C21D 8/0236* (2013.01); *C21D 8/0247* (2013.01); *C21D 9/46* (2013.01); *C22C 38/02* (2013.01); *C22C 38/06* (2013.01); *C22C 38/22* (2013.01); *C22C 38/38* (2013.01); *C23C 2/02* (2013.01); *C23C 2/40* (2013.01); *C23F 17/00* (2013.01); *C25D 5/36* (2013.01); *B23K 2101/006* (2018.08); *B23K 2103/04* (2018.08); *C21D 2211/001* (2013.01); *C21D 2211/008* (2013.01); *C23C 2/06* (2013.01); *C25D 3/22* (2013.01)

(58) Field of Classification Search
CPC ..... C23C 2/06; C23C 2/26; C23C 2/40; C23F 17/00; C25D 3/22; C25D 5/36
See application file for complete search history.

(56) References Cited

U.S. PATENT DOCUMENTS

| | | |
|---|---|---|
| 2010/0193081 A1 | 8/2010 | Mataigne |
| 2010/0282374 A1 | 11/2010 | Mataigne |
| 2010/0304183 A1 | 12/2010 | Honda |
| 2012/0018060 A1 | 1/2012 | Fushiwaka et al. |
| 2012/0222781 A1 | 9/2012 | Azuma et al. |
| 2013/0295411 A1 | 11/2013 | Yoshida et al. |
| 2014/0120371 A1 | 5/2014 | Mbacke et al. |
| 2014/0234658 A1 | 8/2014 | Nozaki et al. |
| 2016/0017452 A1* | 1/2016 | Puerta Velasquez ........................ C21D 8/0205 148/333 |
| 2016/0355900 A1 | 12/2016 | Gil Otin |
| 2017/0145536 A1 | 5/2017 | Girina |

FOREIGN PATENT DOCUMENTS

| | | | |
|---|---|---|---|
| CN | 103649343 | A | 3/2014 |
| CN | 103827335 | A | 5/2014 |
| CN | 106661652 | A | 5/2017 |
| EP | 0812647 | A2 | 12/1997 |
| EP | 2682495 | A1 | 1/2014 |
| EP | 2990501 | A1 | 3/2016 |
| JP | 2004211158 | A | 7/2004 |
| JP | 2005002415 | A | 1/2005 |
| JP | 2006035293 | A | 2/2006 |
| JP | 2006233333 | A | 9/2006 |
| JP | 2008214752 | A | 9/2008 |
| JP | 2006265671 | A | 10/2008 |
| JP | 2010532820 | A | 10/2010 |
| JP | 2011111674 | A | 6/2011 |
| KR | 20100032435 | A | 3/2010 |
| KR | 20150073005 | A | 6/2015 |
| RU | 2397268 | C2 | 8/2010 |
| RU | 2437945 | C2 | 12/2011 |
| RU | 2470097 | C2 | 12/2012 |
| RU | 2544977 | C2 | 3/2015 |

* cited by examiner

ZINC-COATED STEEL SHEET WITH HIGH RESISTANCE SPOT WELDABILITY

The invention relates to the fabrication of high strength zinc-coated steel sheets that make it possible to obtain resistance spot welds with low susceptibility to cracks formation due to Liquid Metal Embrittlement, particularly adapted to the requirements of the automotive industry.

BACKGROUND

Zinc or Zinc-alloy coated steel sheets are very effective for corrosion resistance and are thus widely used in the automotive industry. However, it has been experienced that the welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It has been recognized that a higher stress level increases the LME risk. Since the stresses that are present during the welding itself depend in particular of the strength level of the base metal, it is experienced that welds made out of steels with higher strength are in general more sensitive to LME.

For reducing the LME risk, the publication EP0812647 discloses a method wherein gas shielding arc welding using a metal core wire containing Cu is performed. However, this process is not adapted for the joining of thin sheets in the automotive industry.

JP2006035293 discloses an arc welding method using a stainless steel wire for producing a weld containing more than 25% ferrite and for achieving a tensile strength in the weld less than 1.8 times the tensile strength in the base metal. However, besides the fact that this process is not adapted to the requirements of automotive industry, achieving a low strength in the weld is not desired.

Document JP2004211158 discloses also a process for Electro-Resistance Welding (ERW) of tubes, wherein 3-40 ppm Boron is present in the steel composition. However, the conclusions of this document are related to the specific conditions of the ERW process and cannot be simply transposed to the resistance spot welding process. Furthermore, B addition is not desirable in every high strength steel grade.

Document JP2005002415 proposes to interpose between the coating and the steel substrate, a nickel-based layer for minimizing the diffusion of zinc and thus suppressing the generation of LME cracks in the Heat affected Zone. However, the fabrication of the steel sheet is more complex and costly.

Document EP2682495 discloses a Zinc-Aluminum-Magnesium coated steel sheet wherein the steel composition includes some limitations, in particular in C, Mn and Si so as to obtain high resistance to LME cracking in arc welds. However, this document is pertaining to arc welding and not to resistance spot welding. Furthermore, recent developed steels contain generally higher contents in C, Mn and Si so as to achieve higher tensile strength. Thus, it is not possible to conciliate simply the composition limitations in EP2682495 with the needs of higher strength levels in steel sheets.

Thus, it is desirable to have a zinc-coated, highly formable steel sheet able to be joined by resistance spot welding of Zn-coated sheets that would conciliate two conflicting requirements:

on one hand to achieve tensile strength TS higher than 900 MPa in the base metal sheet, which requests some amount of alloying elements.

on the other hand, to be able to fabricate a resistance spot weld with high resistance to LME, the occurrence of which is less likely to occur when the base metal strength and the alloying level are lower.

More particularly, it is desired to obtain a weld with a small number of LME deep cracks so not to reduce the mechanical performance of the welds. In particular, it is desired that the average number of LME cracks per weld with a depth greater than 100 micrometers, is lower than 2 when the welding intensity is not more than $I_{max}$, corresponding to the expulsion apparition in spot welding, and not higher than 2 when the welding intensity is comprised between $I_{max}$ and $I_{max}+10\%$.

SUMMARY OF THE INVENTION

The present invention provides a method for producing a zinc or zinc-alloy coated steel sheet with a tensile strength higher than 900 MPa, for the fabrication of resistance spot welds containing in average not more than two Liquid Metal Embrittlement cracks per weld having a depth of 100 μm or more, comprising the successive steps of:

providing a cold-rolled steel sheet, the nominal composition of which contains, in weight percent: 0.07%≤C≤0.5%, 0.3%≤Mn≤5%, 0.010%≤Al≤1%, 0.010%≤Si≤2.45%, with 0.35%≤(Si+Al)≤2.5%, 0.001%≤Cr≤1.0%, 0.001%≤Mo≤0.5%, and optionally: 0.005%≤Nb≤0.1%, 0.005%≤V≤0.2%, 0.005%≤Ti≤0.1%, 0.0001%≤B≤0.004%, 0.001%≤Cu≤0.5%, 0.001%≤Ni≤1.0%, the remainder being iron and unavoidable impurities from the smelting, in contents such as S<0.003%, P<0.02%, N<0.008%, then heating the cold-rolled steel sheet up to a temperature T1 comprised between 550° C. and Ac1+50° C. in a furnace zone with an atmosphere (A1) containing from 2 to 15% hydrogen by volume, the balance being nitrogen and unavoidable impurities, so that the iron is not oxidized, then adding in the furnace atmosphere at least one element selected from water steam or oxygen with an injection flow rate Q higher than (0.07%/h×α), α being equal to 1 if said element is water steam or equal to 0.52 if said element is oxygen, at a temperature T≤T1, so to obtain an atmosphere (A2) with a dew point DP2 comprised between −15° C. and the temperature Te of the iron/iron oxide equilibrium dew point, heating the sheet from the temperature $T_1$ up to a temperature $T_2$ comprised between 720° C. and 1000° C. in a furnace zone under an atmosphere (A2) of nitrogen containing from 2 to 15% hydrogen and more than 0.1% CO by volume, with an oxygen partial pressure higher than $10^{-21}$ atm., wherein the duration $t_D$ of said heating of the sheet from temperature T1 up to the end of soaking at temperature T2 is comprised between 100 and 500 s, soaking the sheet at T2, then cooling the sheet at a rate comprised between 10 and 400° C./s, then coating the sheet with zinc or zinc-alloy coating.

Preferably, the dew point DP2 is comprised between −10 and +20° C.

According to an embodiment, the atmosphere (A2) contains more than 0.2% CO by volume.

According to an embodiment, the temperature T2 is comprised between 750 and 900° C., and the atmosphere (A2) contains between 3 to 5% in volume of H2.

According to an embodiment, after the soaking, the steel sheet is cooled down to a temperature T3 comprised between Ms and Ms+150° C., and maintained at T3 for at least 40 s, so to obtain a Carbide Free Bainite steel sheet.

According to an embodiment, the temperature T3 is comprised between Ms+10° C. and Ms+150° C.

According to another embodiment, after the cooling, the steel sheet is cooled down to a temperature QT between Ms−5° C. and Ms−170° C., optionally held at QT for a duration comprised between 2 and 8 s, then reheated up to a temperature T4 between 350 and 550° C., so to obtained partitioned martensite. Preferably, the temperature T4 is comprised between 350 and 490° C.

Preferably, the steel microstructure contains retained austenite in quantity not more than 20%.

According to an embodiment, the coating is performed by hot-dipping.

According to another embodiment, the coating is performed by electroplating.

According to another embodiment, the coating is performed by a vapor deposition technique.

The invention also provides a zinc or zinc-alloy coated steel sheet with a tensile strength higher than 900 MPa for the fabrication of resistance spot welds containing in average not more than two Liquid Metal Embrittlement cracks having a depth of 100 μm or more per weld, comprising a steel substrate, the nominal composition of which contains, in weight percent: 0.07%≤C≤0.5%, 0.3%≤Mn≤5%, 0.010%≤Al≤1%, 0.010%≤Si≤2.45%, with 0.35%≤(Si+Al)≤2.5%, 0.001%≤Cr≤1.0%, 0.001%≤Mo≤0.5%, and optionally: 0.005%≤Nb≤0.1%, 0.005%≤V≤0.2%, 0.005%≤Ti≤0.1%, 0.0001%≤B≤0.004%, 0.001%≤Cu≤0.5%, 0.001%≤Ni≤1.0%, the remainder being iron and unavoidable impurities from the smelting, in contents such as S<0.003%, P<0.02%, N<0.008%, and a zone $D_{100}$ immediately comprised between 0 and 100 micrometers under the zinc or zinc-alloy coating, wherein the average carbon content $Cav_{(100)}$ satisfies in the zone $D_{100}$: $C_{av(100)}/C_{nom}<0.6$, $C_{av(100)}$ being the average content of C in the zone $D_{100}$, $C_{nom}$ being the nominal C content of the steel, and: $C_{av(100)}+(Si_{av(100)})/32<0.21\%$, $C_{av(100)}$ and $Si_{av(100)}$ being respectively the average content of C and Si in the zone $D_{100}$, expressed in weight %.

Preferably, the steel sheet is such that: $C_{av(100)}+(Si_{av(100)}/32)+(Mn_{av(100)}/14)<0.30\%$, $C_{av(100)}$, $Si_{av(100)}$ and $Mn_{av(100)}$ being respectively the average content of C, Si and Mn in the zone $D_{100}$, expressed in weight %.

Preferably, the steel sheet is such that: $C_{av(100)}+(Si_{av(100)}/32)+(Mn_{av(100)}/14)-(Al_{av(100)}/48)+(Cr_{av(100)}/11)<0.34\%$, $C_{av(100)}$, $Si_{av(100)}$, $Mn_{av(100)}$, $Al_{av(100)}$, $Cr_{av(100)}$ being respectively the average content of C, Si, Mn, Al, Cr in the zone $D_{100}$, expressed in weight %.

According to an embodiment, the Mn content is not constant in the zone $D_{100}$ and: $d_{Mnmin}>1$ μm, $d_{Mnmin}$ being the depth in $D_{100}$ at which the Mn content is equal to the minimum value $Mn_{min}$ in the zone $D_{100}$ and: $d_{Mnmin}/(Mn_{min}/Mn_{nom})>8$, $Mn_{nom}$ being the nominal Mn content of the steel.

According to an embodiment, the Si content is not constant in the zone $D_{100}$ and: $d_{Simin}>1$ μm, $d_{Simin}$ being the depth in $D_{100}$ at which the Si content is equal to the minimum value $Si_{min}$ in the zone $D_{100}$ and: $d_{Simin}/(Si_{min}/Si_{nom})>4$, $Si_{nom}$ being the nominal Si content of the steel.

The invention also provides a method for fabrication of a resistance spot weld containing not more than two Liquid Metal Embrittlement cracks having a depth of 100 μm or more, comprising the following successive steps of:

providing at least two zinc or zinc-alloy coated steel sheets as described above, the thickness of which is comprised between 0.5 and 2.5 mm, then superposing partly at least the zinc or zinc-coated steel sheets, then applying a force comprised between 350 and 500 daN by means of electrodes placed perpendicular and on the outer sides of the superposed sheets, then welding the steels sheets with an intensity I comprised between Imin and 1.10 Imax, Imin being the minimum intensity above which pullout failure is observed when the resistance spot weld is submitted to shear tensile test, Imax being the intensity at which expulsion of liquid metal starts to be observed in resistance spot welding.

The invention also provides a method for the fabrication of a resistance spot weld containing not more than two Liquid Metal Embrittlement cracks having a depth of 100 μm or more, comprising the following successive steps of:

providing at least two zinc or zinc-alloy coated sheets of a steel (1) with TS>900 MPa, the thickness of which is comprised between 0.5 and 2.5 mm, measuring $C1_{av(100)}$, $Si1_{av(100)}$, $Mn1_{av(100)}$, $Al1_{av(100)}$, $Cr1_{av(100)}$, these quantities designating respectively the average content of C, Si, Mn, Al, Cr in the zone $D_{100}$ of the steel substrate comprised between 0 and 100 micrometers under the zinc or zinc-alloy coating, then calculating the factor $CSI_1$ of steel (1):

$$CSI_1 = C1_{av(100)} + (Si1_{av(100)}/32) + (Mn1_{av(100)}/14) - Al1_{av(100)}/48) + (Cr1_{av(100)}/11)$$

then performing resistance spot welding on at least 10 welds with an intensity I1 comprised between Imin and 1.1 Imax, Imin being the minimum intensity above which pullout failure is observed when the resistance spot weld is submitted to shear tensile test, Imax being the intensity at which the expulsion of liquid metal starts to be observed in resistance spot welding, then measuring the average number $Crack1_{av}$ of Liquid Metal Embrittlement cracks having a depth of 100 μm or more, from the at least 10 welds, then, if $Crack1_{av}$ is higher than 2, providing a second zinc or zinc-alloy coated steel sheet (2) with TS>900 MPa, the thickness of which is identical to the one of steel (1), the composition of steel (2) being selected so as: $CSI_2<CSI_1-((Crack1_{av}-2)/20)$ with:

$$CSI_2 = C2_{av(100)} + (Si2_{av(100)}/32) + (Mn2_{av(100)}/14) - (Al2_{av(100)}/48) + (Cr2_{av(100)}/11),$$ $C2_{av(100)}$, $Si2_{av(100)}$, $Mn2_{av(100)}$, $Al2_{av(100)}$, $Cr2_{av(100)}$ designating respectively the average content of C, Si, Mn, Al, Cr in the zone $D_{100}$ of the steel (2) substrate comprised between 0 and 100 micrometers under the zinc or zinc-alloy coating, then performing resistance spot welding on the steel sheet (2) with the intensity I1.

The invention also provides the use of a steel sheet as described above, or manufactured as described above, for the fabrication of structural parts of automotive vehicles.

DETAILED DESCRIPTION

The invention will now be described in details and illustrated by examples without introducing limitations.

First, cold-rolled steel sheets are provided with a thickness th comprised between 0.5 and 2.5 mm which is a typical thickness range used in the automotive industry. The steel sheets implemented in the invention are fabricated through a process comprising successively the steps of casting, hot rolling, coiling, optionally intermediate annealing, pickling, cold rolling, continuous annealing, and coating. The composition of the steel contains the following elements, in weight %:

Carbon: between 0.07% and 0.5%. If the carbon content is below 0.07%, the tensile strength can be insufficient, i.e. lower than 900 MPa. Furthermore, if the steel microstructure contains retained austenite, its stability which is necessary for achieving sufficient elongation, can be not obtained.

Above 0.4% C, weldability is reduced because low toughness microstructures are created in the Heat Affected Zone or in the molten zone of the spot weld. In a preferred embodiment, the carbon content is in the range between 0.18 and 0.4%, which makes it possible to achieve a tensile strength higher than 1180 MPa. When a Zn-coated steel sheet is heated, low carbon content in the steel substrate reduces the interaction between the steel and the liquid Zn or Zn alloy. As a result, LME is less likely to occur.

Manganese is a solid solution hardening element which contributes to obtain a tensile strength higher than 900 MPa. Such effect is obtained when Mn content is at least 0.3% in weight. However, above 5%, Mn addition contributes to the formation of a structure with excessively marked segregated zones which can adversely affect the welds mechanical properties. Preferably, the manganese content is in the range between 1.5 and 3% to achieve these effects. This makes it possible to obtain satisfactory mechanical strength without increasing the difficulty of industrial fabrication of the steel and without increasing the hardenability in the welds. In specific annealing conditions, Mn reacts with Si and O and thus decreases the amount of Si in the steel in the sub-surface area. Thus, if Mn is kept below a specific amount under the Zn coating, in conjunction with C, Si, Al and Cr, the LME resistance is increased.

Silicon must be comprised between 0.010 and 2.45% to achieve the requested combination of mechanical properties and weldability: silicon reduces the carbides precipitation during the annealing after cold rolling of the sheet, due to its low solubility in cementite and due to the fact that this element increases the activity of carbon in austenite. Thus, the enrichment of austenite in carbon leads to its stabilization at room temperature and to the apparition of a Transformation Induced Plasticity ("TRIP") behavior which means that the application of a stress, during forming for example, will lead to the transformation of this austenite into martensite. When Si is higher than 2.45%, strongly adhering oxides could be formed during annealing before hot dip galvanizing, which could lead to surface defects in the coating. As for C, lowering Si promotes LME during resistance spot welding. By controlling the annealing conditions, the amount of Si under the coating can be modified. Dew point controls the partial pressure of oxygen inside the annealing furnace. The oxygen diffuses inside the steel and reacts with Si so to create $SiO_2$. As a result, the amount of Si in the steel sub-surface area is lowered. Thus, if Si is kept below a specific amount under the Zn coating, the LME resistance is increased.

Aluminum must be comprised between 0.010 and 1%. With respect to the stabilization of retained austenite, aluminum has an influence that is relatively similar to the one of the silicon. However, aluminum content higher than 1% in weight would increase the Ac3 temperature, i.e. the temperature of complete transformation into austenite in the steel during the annealing step and would therefore make the industrial process more expensive. Thus, Al content is limited to 1%.

As highly formable steels include retained austenite at room temperature, a sufficient stabilization of the austenite has to be present through the addition of silicon and/or aluminum in the steel composition, in quantities such as: (Si+Al)≥0.35%. If (Si+Al)<0.35%, the fraction of retained austenite could be less than 5%, thus the ductility and strain hardening properties in cold-forming could be insufficient. However, if (Si+Al)>2.5%, the coatability and the weldability are decreased.

Chromium makes it possible to delay the formation of pro-eutectoid ferrite during the cooling step after holding at the maximal temperature during the annealing cycle, making it possible to achieve higher strength level. Thus, the chromium content is higher than 0.001% and less than 1.0% for reasons of cost and for preventing excessive hardening. Cr affects also the LME resistance of steel: in specific annealing conditions, Cr reacts with Mn and O. in the sub-surface area. Thus, if Cr is kept below a specific amount under the Zn coating, in conjunction with C, Si, Al and Cr, the LME resistance can be increased.

Molybdenum in quantity comprised between 0.001% and 0.5% is efficient for increasing the hardenability and stabilizing the retained austenite since this element delays the decomposition of austenite.

The steels may optionally contain elements which are able to precipitate under the form of carbides, nitrides or carbonitrides, thus achieving precipitation hardening. For this purpose, the steels may contain niobium, titanium or vanadium: Nb and Ti, each in quantity comprised between 0.005 and 0.1%, and V in quantity comprised between 0.005 and 0.2%.

The steels may optionally contain nickel, in quantity comprised between 0.001% and 1.0% so to improve the toughness.

The steels may also optionally contain copper for providing additional hardening, in quantity comprised between 0.001% and 0.5%.

The steels may also optionally contain boron in quantity comprised between 0.0001 and 0.005%, preferably between 0.0001 and 0.004%. By segregating at the grain boundary, B decreases the grain boundary energy and is thus beneficial for increasing the resistance to liquid metal embrittlement.

The balance in the composition consists in iron and residual elements resulting from the steelmaking. In this respect, S, P and N at least are considered as residual elements or unavoidable impurities. Therefore, their contents are less than 0.003% for S, 0.02% for P and 0.008% for N.

The composition above is to be understood as the nominal composition, i.e. the composition of the steel sheet which is present in the zone centered on the mid-thickness of the sheet, excluding the two zones of 100 micrometers thickness, located immediately under the two main surfaces of the steel sheet. As will be explained below, in the invention, this nominal composition is different from the local composition present at the surface of the steel substrate, immediately below the Zn-coating.

After cold-rolling, the steel microstructure is highly anisotropic and the ductility properties are reduced. Thus, annealing is performed for achieving grain recrystallization and for obtaining austenitic transformation which makes it possible to produce the final desired microstructure. Annealing is performed by continuous displacement of the steel strip in a furnace divided in several zones.

According to the invention the cold rolled steel sheet is continuously annealed in a radiant tube furnace or a resistance furnace or an induction furnace or a furnace combining at least any two of these methods, to a temperature T1 between 550° C. and Ac1+50° C., where Ac1 designates the temperature of the start of the austenitic transformation as the steel is heated in a furnace zone where the atmosphere (A1) contains from 2 to 15% of hydrogen by volume, preferably 3-5% of hydrogen by volume, the balance being nitrogen and unavoidable impurities, and having a dew point DP1 such as the iron is not oxidized. This value can be determined for example from the publication of D. Huin, P. Flauder, J. B. Leblond, "Numerical simulation of internal oxidation of steels during annealing treatments". Oxidation of Metals 2005; 64; 1:131-67.

The sheet is then heated from the temperature T1 up to a temperature T2 comprised between 720 and 1000° C., while at least one element selected from water steam or oxygen starts to be injected into the furnace at the temperature T1.

In the case of water steam, the temperature of which is comprised between 90 and 150° C., the injection flow rate Q must be higher than 0.07% per hour in order to obtain the modifications of the steel sheet surface that will be detailed below, making it possible to obtain high LME resistance. The injection rate Q is evaluated by dividing the injected steam volume per hour by the volume of the furnace zone between the injection location of water steam and the end of the furnace section heated at the soaking temperature T2, as will be described below.

In the case of oxygen injection, the injection flow rate Q has to be higher than 0.036%/h in order to obtain the modifications of steel surface necessary to increase the resistance to LME. The injection rate Q is evaluated by dividing the injected volume of oxygen per hour by the volume of the furnace between the injection location of oxygen and the end of the furnace section heated at the soaking temperature T2.

Thus, whatever injection type is performed (water steam or oxygen), the minimal injection flowrate Q for obtaining increased LME resistance is $(0.07\%/h \times \alpha)$, $\alpha$ being equal to 1 if injected element is water steam or equal to 0.52 if injected element is oxygen.

In the section of the furnace between the temperature T1 and the temperature T2, the atmosphere (A2) must have a dew point DP2 between $-15°$ C. and the temperature Te of the iron/iron oxide equilibrium dew point, preferably between $-10°$ C. to $+20°$ C. The atmosphere (A2) contains nitrogen and between 2 to 15% of hydrogen by volume, preferably between 3-5% of hydrogen by volume. The temperature Te may be for example determined from the publication: JANAF Thermomechanical Tables, 3rd Edition, Part II, Journal of Physical and Chemical Reference Data, Volume 14, 1985, supplement no. 1, published by American Chemical Society and the American Institute of Physics for the National Bureau of Standards.

Due to the specific flowrate Q, the atmosphere (A2) contains more than 0.1% CO by volume, preferably more than 0.2% CO by volume, and the oxygen partial pressure in atmosphere (A2) is higher than $10^{-21}$ atm. This makes it possible to obtain the modifications in C, Mn, Si, Al, Cr in the sub-surface zone of steel sheet, located between 0 and 100 microns.

The duration time $t_D$ between T1 and the end of soaking at T2 is comprised between 100 and 500 s. If the duration $t_D$ is less than 100 s, the modification of the steel composition in the sub-surface zone located between 0 and 100 microns, is insufficient to improve significantly the resistance to LME. If the time $t_D$ is more than 500 s, there is a risk that the mechanical properties of the steel sheet become insufficient.

The sheet is then soaked at a temperature between T2 and T2+50° C. under the above mentioned atmosphere (A2).

After the soaking at temperature T2, for a duration that can be comprised between 30 and 400 s, the steel sheet is cooled so to obtain microstructures combining high formability and tensile strength higher than 900 MPa. Cooling can be performed by using nitrogen with 5 to 70% hydrogen or water quenching so to obtain cooling rate comprised between 10° C./s to 400° C./s.

According to one embodiment, for obtaining carbides free bainite ("CFB") microstructure, the sheet steel is cooled down to a temperature T3 comprised between Ms and Ms+150° C., or between Ms+10° C. and Ms+150° C. Thereafter, the steel sheet is maintained at the temperature T3 for at least 40 s to obtain microstructure transformation. The final microstructure contains typically 10-20% of retained austenite and more than 50% of bainite which is practically free from coarse carbides, i.e. being such that the number per unit area of inter-laths carbides having a size larger than 0.1 μm, is not more than 50000/mm$^2$.

According to another embodiment, for obtaining quenched and partitioned ("Q-P") microstructure, the sheet steel is cooled down to a temperature QT below martensite start temperature (Ms), i.e. between Ms$-5°$ C. and Ms$-170°$ C., optionally held at QT for a duration comprised between 2 and 8 s then reheated up to a temperature T4 between 350 and 550° C., preferably between 350 and 490° C. and soaked between 30 and 500 s in an atmosphere (A3) such that no surface re-oxidation of the iron occurs. Preferably, this atmosphere contains 2 to 15% of hydrogen by volume, and more preferably 3-5% of hydrogen by volume.

The final microstructure contains typically 3-20% of retained austenite, more than 25% of partitioned martensite, i.e. tempered martensite having a C content that is lower than the nominal C content of the steel.

The steel sheet is thereafter hot-dip coated in a Zn-based liquid metal bath maintained at the temperature Tbm. In this respect, the steel having a temperature comprised between Tbm$-10°$ C. and Tbm+50° C. continuously passes through the liquid metal bath to be coated. The sheets are zinc or zinc-alloy coated sheets, the latter expression designating a coating wherein the Zn content is higher than 50% in weight. In particular, the coating can be performed by Hot-Dip-Galvanized ("GI"), or by hot-dip galvanizing immediately followed by a heat-treatment at about 475-570° C. so to cause diffusion of iron in the coating and to obtain a "galvannealed", or "GA" coating containing about 7-14% Fe. It can be also a zinc or zinc-alloy coating obtained by an electroplating process or by a vapor deposition process. The Zn-alloy can be also a Zn—Mg—Al coating, such as for example a Zn-3% Mg-3.7% Al or a Zn-1.2% Al-1.2% Mg coating.

In a preferred embodiment for producing galvanized coated steel sheet (GI), after the soaking at T3 or T4 (according to the desired microstructure, CFB or Q-P steel), the steel sheet is heated to 465° C.±20° C. and hot-dip galvanized in a liquid zinc bath containing 0.15-0.40 wt. % aluminum maintained at 460° C.±20° C. Galvanizing duration is comprised between 2 and 10 s.

In another preferred embodiment for producing galvannealed coating (GA), galvanizing is carried out in a liquid zinc bath containing 0.10-0.17 wt. % aluminum maintained at 460° C.±20° C. followed by post coating heat treatment at 475-570° C.

Zinc coating can be also applied on the steel sheet via electroplating method. In this process steel sheet is cooled to room temperature after soaking at T3 or T4 temperature. This steel sheet is then dipped into an electro-galvanizing bath comprising a solution of chloride or sulfate based salts of zinc maintained at 50-100° C. In this process, a current is flowing through two anodes while the sheet steel acts as a cathode.

Zinc coating can be also applied on the steel sheet by a vapor deposition method which is known per se.

In a surprising manner, the inventors have evidenced that the combination of a high tensile strength and of a high resistance to LME cracking can be obtained when the steel sheet nominal composition corresponds to the features described above, and when the composition of the zone $D_{100}$ located between 0 and 100 μm immediately below the Zn or Zn-alloy coating, displays specific features. It is to be understood that this zone $D_{100}$ is present on each of the two main surfaces on the steel sheet. The specific features in this zone are obtained in the annealing process namely by specific temperatures, injection flow rate, furnace atmospheres, duration and dew point ranges which make it possible to modify the composition of the steel surface before applying the Zn or Zn alloy coating. Thus, a zone having a modified composition, namely in carbon, manganese, silicon, aluminum and chromium, is obtained. The average composition of this zone and the gradients of Mn and Si within this zone are controlled by the nominal steel composition, the temperatures T1 and T2, the flow rate Q, the duration $t_D$ between T1 and the end of soaking at T2 and the furnace atmospheres. In particular, the dew point DP2 and the oxygen partial pressure between T1 and T2 have a strong influence on the nature and depth of the zone.

In the zone $D_{100}$ under the Zn or Zn alloy coating, the composition of the steel differs as compared to the steel nominal composition. This specific zone improves the resistance to LME cracking in spot welding. As compared to the steel sheet immediately before hot-dipping in the Zn bath, it has been experienced that about one micrometer of the steel sheet surface reacts with or dissolves into the liquid zinc alloy bath.

The content profiles of elements such as C, Mn Si, Cr, Al, in the zone $D_{100}$ as well as their average content in this zone, respectively: $C_{av(100)}$, $Si_{av(100)}$, $Mn_{av(100)}$, $Al_{av(100)}$, $Cr_{av(100)}$, can be measured by a technique known per se such as for example Glow-Discharge Optical Emission Spectroscopy (GDOES)

$C_{av(100)}$ can thus be compared with the nominal C content of the steel sheet, $C_{nom}$. The inventors have put into evidence that a certain amount of decarburization must be present in $D_{100}$, i.e. that $C_{av(100)}/C_{nom}$ must be lower than 0.6, in order to improve the resistance to LME cracking. Further to the creation of this gradient in C at the surface of the steel sheet, the inventors have evidenced that LME resistance is obtained effectively when C and Si in $D_{100}$ are such that: $C_{av(100)}+Si_{av(100)}/32<0.21\%$.

Furthermore, correlating the resistance to LME cracking (as measured by the average number per weld of cracks deeper than 100 µm) with the elements present in $D_{100}$, the inventors have evidenced that a better correlation coefficient is obtained by taking into account C, Si and Mn in $D_{100}$ so to define in this zone a condition: $C_{av(100)}+(Si_{av(100)}/32)(Mn_{av(100)}/14)<0.30\%$.

In the most severe welding conditions, i.e. with geometry associated to high restraint, and with high welding intensity, it has been found that C, Mn, Si, Al Cr must be all taken into account for obtaining optimum resistance to LME, i.e. that these elements must satisfy in zone $D_{100}$ to the condition:

$$C_{av(100)}+(Si_{av(100)}/32)+(Mn_{av(100)}/14)-(Al_{av(100)}/48)+(Cr_{av(100)}/11)<0.34\%$$

Furthermore, the annealing conditions create gradients in Mn and in Si in the zone $D_{100}$, so that concentration of these elements vary in this zone: minimum values in Si and in Mn content (respectively $Si_{min}$ and $Mn_{min}$) are experienced at certain distances under the Zn coating, respectively $d_{Simin}$ and $d_{Mnmin}$.

The inventors have evidenced that high resistance to LME cracking is obtained when: $d_{Simin}>1$ µm, and when: $d_{Simin}(Si_{min}/Si_{nom})>4$, $Si_{nom}$ designating the nominal Si content of the steel.

With respect to Mn, in a similar manner, high resistance to LME is observed when: $d_{Mnmin}>1$ µm, and when: $d_{Mnmin}/(Mn_{min}/Mn_{nom})>8$, $Mn_{nom}$ designating the nominal Mn content of the steel.

Furthermore, based on their numerous observations and findings, the inventors have derived a method for the fabrication resistance spot welds containing not more than two Liquid Metal Embrittlement cracks with a depth of 100 µm or more. In a current situation, when LME cracks are experienced, trials to modify nominal steel compositions or coatings are performed. However, an eventual improvement due to these modifications may have no character of generality: for example, an improvement can be significant for a welding condition 1 and less significant for a welding condition 2 with a different intensity.

The inventors have established correlations between the LME resistance (as measured by the average number of cracks deeper than 100 µm) and the parameter $CSI=C_{av(100)}+(Si_{av(100)}/32)+(Mn_{av(100)}/14)-(Al_{av(100)}/48)+(Cr_{av(100)}/11)$ for different welding intensity values around Imax, this being the intensity at which expulsion of liquid metal starts to be observed in resistance spot welding. They have observed that the number of cracks is a linear function of CSI, and that the slope of this correlation was about the same whatever the intensity in the range around Imax. Based on this finding, the inventors conceived the following method for improving more easily LME issues: as a first step, zinc or zinc-alloy coated sheets of a steel (1) with TS>900 MPa are provided, with a thickness comprised between 0.5 and 2.5 mm. These steel sheets are to be joined by resistance spot welding.

Then, $C1_{av(100)}$, $Si1_{av(100)}$, $Mn1_{av(100)}$, $Al1_{av(100)}$, $Cr1_{av(100)}$ are measured, these quantities designating respectively the average content of C, Si, Mn, Al, Cr in the zone $D_{100}$ of the steel substrate comprised between 0 and 100 micrometers under the zinc or zinc-alloy coating. The factor $CSI_1$ of steel (1) is calculated through: $CSI_1=C1_{av(100)}+(Si1_{av(100)}/32)+(Mn1_{av(100)}/14)-(Al1_{av(100)}/48)+(Cr1_{av(100)}/11)$ Resistance spot welding is thereafter performed on at least 10 welds with an intensity I1 comprised between 1 min and 1.1 Imax, 1 min being the minimum intensity above which pullout failure is observed when the resistance spot weld is submitted to shear tensile test, Imax being the intensity at which expulsion of liquid metal starts to be observed in resistance spot welding.

Afterwards, the average number $Crack1_{av}$ of LME cracks having a depth of 100 µm or more, from the at least 10 welds, is measured. If the result is not satisfactory, i.e., if $Crack1_{av}$ is higher than 2, the inventors have derived a method for rapidly providing a steel sheet that can meet the requirements:

A second zinc or zinc-alloy coated steel sheet (2) with TS>900 MPa and with a thickness identical to the one of steel (1) is provided, the composition of this steel (2) being selected so as to fulfill: $CSI_2<CSI_1-((Crack1_{av}-2)/20)$, with:

$$CSI_2=C2_{av(100)}+(Si2_{av(100)}/32)+(Mn2_{av(100)}/14)-(Al2_{av(100)}/48)+(Cr2_{av(100)}/11)$$

$C2_{av(100)}$, $Si2_{av(100)}$, $Mn2_{av(100)}$, $Al2_{av(100)}$, $Cr2_{av(100)}$ designating respectively the average content of C, Si, Mn, Al, Cr in a zone $D_{100}$ of the steel (2) substrate comprised between 0 and 100 micrometers under the zinc or zinc-alloy coating, in weight %. Then the steel (2) is welded with the same intensity I1.

This method ensures that the spot welds thus fabricated from steel (2) will be satisfactory, and saves costly and time-consuming trials and errors tests.

The invention will be now illustrated by the following examples which are by no way limitative.

Example 1

Cold-rolled steel sheets with thickness ranging between 1.4 and 1.6 mm have been provided, the nominal compositions referenced as A-F, being reported in Table 1. The remainder of the composition is iron and unavoidable impurities resulting from the smelting. In particular, S, P, and N, in weight %, are such that: S<0.003%, P<0.02%, N<0.008%.

The Ac1 and Ms temperatures, corresponding respectively to the start of transformation into austenite on heating, and to the start of martensite transformation on cooling, have been also reported in Table 1.

TABLE 1

Steel compositions (weight %)

| Steel | Thickness. (mm) | C | Si | Mn | Al | Cr | Si + Al | Mo | Ac1 (° C.) | Ms (° C.) |
|---|---|---|---|---|---|---|---|---|---|---|
| A | 1.5 | 0.20 | 1.50 | 2.21 | 0.04 | 0.20 | 1.54 | 0.001 | 730 | 360 |
| B | 1.6 | 0.21 | 0.67 | 2.07 | 0.68 | 0.10 | 1.35 | 0.001 | 726 | 370 |
| C | 1.6 | 0.22 | 1.48 | 2.07 | 0.03 | 0.35 | 1.51 | 0.001 | 735 | 360 |
| D | 1.4 | 0.22 | 1.52 | 2.06 | 0.04 | 0.35 | 1.56 | 0.001 | 735 | 360 |
| E | 1.6 | 0.37 | 1.90 | 1.90 | 0.03 | 0.35 | 1.93 | 0.12 | 780 | 250 |
| F | 1.6 | 0.18 | 1.50 | 2.00 | 0.03 | 0.001 | 1.53 | 0.001 | 760 | 240 |

These steel sheets have been submitted to different annealing cycles. The Table 2 reports the atmospheres, temperatures, flow rates, dew points and duration at temperature T1 and T2 in these different conditions. Thus, the sheet D3 designates for example the cold-rolled steel with the composition D which has been submitted to the annealing condition 3.

In the conditions 2-5, injection in the furnace at temperature T1 has been performed with steam water having a temperature of 110° C.

No iron oxidation takes place in A1.

In the annealing condition 1, the steel sheet surface was not sufficiently modified, thus the specific surface features making it possible to achieve high resistance to LME are not present, as can be seen from tests B1c, E1a, E1b in tables 4 and 5 below.

In the annealing condition 2, steam injection was performed, however with an insufficient steam flow rate of 0.05%/h. The CO percentage and the oxygen partial pressure in atmosphere A2 were also insufficient to achieve high LME resistance, as can be seen from tests A2c and C2d in table 4 and 5.

In the annealing conditions 3-5, the water steam injection was performed according to the conditions of the invention.

After soaking at T2, steel sheets A-D have been cooled at a cooling rate comprised between 10 and 400° C./s until a temperature T3 equal to Ms+45° C. for steel A, Ms+90° C. for steel B, Ms+40° C. for steels C and D. Maintaining duration at T2 is 300 s, 40 s, and 360 s, respectively for steels A, B, and C-D.

Steel E has been cooled down to a temperature QT of 225° C. then reheated up to a temperature T4 of 410° C. for a duration of 90 s.

Steel F has been cooled down to a temperature QT of 150° C. then reheated up to a temperature T4 of 465° C. for a duration of 120 s.

Steel sheets A and C-F have been electroplated (EG) with pure zinc while steel B has been hot-dip galvanized (GI) in a Zn bath containing 0.3% Al and 0.4% Fe. All the applied coatings have a similar thickness of 7 μm.

The content variations of C, Mn Si, Cr, Al, in the zone $D_{100}$ and the average value of these elements in this zone (respectively: $C_{av(100)}$, $Si_{av(100)}$, $Mn_{av(100)}$, $Al_{av(100)}$, $Cr_{av(100)}$, has been measured by Glow-Discharge Optical Emission Spectroscopy (GDOES).

The microstructure of the sheets obtained from steels A-D contains 12% of retained austenite and more than 50% of bainite having a number per unit area of inter-laths carbides with a size larger than 0.1 μm, not more than 50000/mm². The microstructure of steels obtained from steels E-F contains 3-20% of retained austenite, with more than 25% of partitioned martensite.

TABLE 2

Annealing conditions

| Condition | Atmosphere (A1) | Dew point DP1 in (A1) (° C.) | T1 (° C.) Temperature of injection start | Flow rate of water steam injection Q (%/hr) | Atmosphere (A2) | Dew Point DP2 in (A2) (° C.) | Oxygen partial pressure in A2 (atm) | T2 (° C.) Annealing temperature | Duration $t_D$ between T1 and the end of soaking at T2 (s) |
|---|---|---|---|---|---|---|---|---|---|
| 1 | N₂ + 5% H₂ | −60 | — | 0 | N₂ + 5% H₂ < 0.02% CO | −60 | $3.85 \times 10^{-26}$ (steel B)  $2.13 \times 10^{-24}$ (steel E) | 815 for steel B  900 for steel E | 430 for steel B  300 for steel E |
| 2 | N₂ + 5% H₂ | −60 | 550 | 0.05 | N₂ + 5% H₂ < 0.02% CO | −40 | $9.11 \times 10^{-24}$ (steel A)  $7.91 \times 10^{-23}$ (steel C) | 825 for steel A  870 for steel C | 300 |
| 3 | N₂ + 5% H₂ | −60 | 550 | 1.0 | N₂ + > 5% H₂ > 0.2% CO | −15 | $1.32 \times 10^{-20}$ | 870 | 300 |
| 4 | N2 + 5H2 | −60 | 715 | 3.6 | N₂ + > 5% H₂ 0.7% CO | +10 | $6.60 \times 10^{-20}$ | 820 | 200 |
| 5 | N2 + 5H2 | −60 | 820 | 5.8 | N₂ + > 5% H₂ 1.2% CO | +10 | $2.84 \times 10^{-18}$ | 900 | 300 |

Underlined values: not according to the invention

The steel sheets have been resistance spot welded under alternating current of 50 or 60 HZ and an electrode force of 450-500 daN in different conditions according to Table 3. Electrodes are positioned perpendicularly to steel sheets. D3d designates for example a weld made out of the steel D annealed in condition referenced as no. 3, welded according to the condition d.

by applying different values of intensity, it is possible to determine the suitable welding range defined by Imin which is the minimum intensity above which pullout failure is observed when the resistance spot weld is submitted to shear tensile test, and Imax which is the intensity at which expulsion of liquid metal starts to be observed in resistance spot welding. The selection of intensity in industrial conditions is often made around this last value since it corresponds to a large weld nugget diameter which makes it possible to obtain high weld tensile properties. In the present case, welding has been performed at $I_{max}$ and slightly above in the expulsion domain, i.e. $I_{max}$+10%. Although the welding with intensity comprised between $I_{max}$ and $I_{max}$+10% increases the LME susceptibility, this condition can be encountered in some cases in industrial practice.

Table 3 reports also the welding sequence: for example 12-2-12 indicates that the welding sequence is composed of 12 periods of 20 ms during which the current flows, ("hot periods") followed by two periods of 20 ms during which the current does not flow ("cold periods") and finally 12 periods of current flow.

By welding two or three sheets together and creating a stackup configuration, the sensitivity to LME cracking is higher with increased stackup thickness. Heterogeneous welding is performed, the other steel sheet being a mild steel with a composition containing: 0.032% C, 0.008% Si, 0.222% Mn, 0.052% Al, 0.039% Cr and 0.012% N. Mild steel is chosen because its spot welding needs higher current level to get proper welds than the steels having a tensile stress higher than 900 MPa. This high current level induce high heat input and by consequence induce mores LME cracks during the welding of high resistance steels. Thus, the severity of the welding conditions is increased. Table 3 reports the total thickness of the stackups. In these stackups, the welding is performed in such a way that the steel sheet having a tensile strength higher than 900 MPa has one surface in contact with a welding electrode. The eventual cracks are more prone to occur in the indentation zone created by the welding electrode at the sheet surface.

TABLE 3

Resistance spot welding conditions

| Welding Condition | No. of layers in the stackup | Stackup thickness (mm) | Welding sequence | Welding intensity |
|---|---|---|---|---|
| a | 2 | 3.2 mm | 12-2-12 (60 Hz) | $I_{max}$ and $I_{max}$ + 10%. |
| b | 3 | 4.2 mm | 12-2-12 (60 Hz) | $I_{max}$ and $I_{max}$ + 10%. |
| c | 3 | 4.9 or 5.1 mm | 9-2-9-2-9-2 (50 Hz) | $I_{max}$ |
| d | 3 | 4.9 or 5.1 mm | 10-2-10-2-10-2 (50 Hz) | $I_{max}$ |

The observation and the quantification of cracks due to LME have been performed in the following conditions: after half-cross sectioning and fine-polishing of ten to twenty welds, the weld sections have been observed through optical microscope with magnification between 10 and 1000. The number of cracks having depth over 100 microns was measured for each weld, and the average number of LME cracks deeper than 100 μm per spot weld has been calculated over the series of 20 welds.

High resistance to LME cracking is obtained when the average number of cracks is less than 2 in the case of welding with $I=I_{max}$ or when the average number of cracks is less than or equal to 2, in the case of welding with $I_{max}$+10%.

Tables 4 and 5 shows the average LME cracks number determined in the welding conditions of $I_{max}$ or $I_{max}$+10%, in relationship with some specific features of the steel composition in the zone $D_{100}$ under the Zn coating, as measured from GDOES. Furthermore, Table 4 reports the minimal tensile strength that has been measured in the base metal.

TABLE 4

Features of the zone $D_{100}$ under Zn coating-Occurrence of LME cracking- Base metal tensile strength

| Weld | $C_{av(100)}$ (%) | $C_{av(100)}/C_{nom}$ | (I) (%) | (II) (%) | (III) (%) | Average number of cracks/weld (>100 μm) at $I_{max}$ | Average number of cracks/weld (>100 μm) at $I_{max}$ + 10% | Minimum Tensile strength of base metal (MPa) |
|---|---|---|---|---|---|---|---|---|
| D3d | 0.112 | 0.511 | 0.155 | 0.280 | 0.314 | 1.52 | n.a. | 1180 |
| F4a | 0.006 | 0.033 | 0.051 | 0.187 | 0.192 | 0 | 0 | 980 |
| F4b | 0.006 | 0.033 | 0.051 | 0.187 | 0.192 | 1 | 1.33 | 980 |
| E5a | 0.065 | 0.177 | 0.131 | 0.281 | 0.319 | 0 | 0 | 1470 |
| E5b | 0.065 | 0.177 | 0.131 | 0.281 | 0.319 | 1 | 2 | 1470 |
| <u>B1c</u> | 0.201 | <u>0.942</u> | <u>0.220</u> | <u>0.352</u> | <u>0.365</u> | <u>2.10</u> | n.a. | 980 |
| <u>E1a</u> | <u>0.283</u> | <u>0.764</u> | <u>0.349</u> | <u>0.499</u> | <u>0.537</u> | <u>2</u> | <u>3</u> | 1470 |
| <u>E1b</u> | <u>0.283</u> | <u>0.764</u> | <u>0.349</u> | <u>0.499</u> | <u>0.537</u> | <u>2.66</u> | <u>6.5</u> | 1470 |
| <u>A2c</u> | 0.170 | <u>0.841</u> | <u>0.211</u> | <u>0.343</u> | <u>0.365</u> | <u>2.67</u> | n.a. | 1050 |
| <u>C2d</u> | 0.178 | <u>0.813</u> | <u>0.236</u> | <u>0.380</u> | <u>0.411</u> | <u>3.45</u> | n.a. | 1180 |

(I) = $C_{av(100)}$ + $Si_{av(100)}/32$ (II) = $C_{av(100)}$ + $(Si_{av(100)}/32)$ + $(Mn_{av(100)}/14)$ (III) = $C_{av(100)}$ + $(Si_{av(100)}/32)$ + $(Mn_{av(100)}/14)$ − $(Al_{av(100)}/48)$ + $(Cr_{av(100)}/11)$

Underlined values: not according to the invention.

n.a.: not assessed.

TABLE 5

Mn and Si features in the zone $D_{100}$ under Zn coating-Occurrence of LME cracking

| Weld | $d_{Mnmin}$ (μm) | $d_{Mnmin}$ ($Mn_{min}$/$Mn_{nom}$) | $d_{Simin}$ (μm) | $d_{Simin}$/ ($Si_{min}$/$Si_{nom}$) | Average number of cracks/weld (>100 μm) at $I_{max}$ | Average number of cracks/weld (>100 μm) at $I_{max}$ + 10% |
|---|---|---|---|---|---|---|
| D3d | 2.2 | 11.3 | 4.2 | 4.2 | 1.52 | n.a. |
| F4a | 8.9 | 14.4 | 9.5 | 11.3 | 0 | 0 |
| F4b | 8.9 | 14.4 | 9.5 | 11.3 | 1 | 1.33 |
| E5a | 13.7 | 30 | 16.0 | 20.8 | 0 | 0 |
| E5b | 13.7 | 30 | 16.0 | 20.8 | 1 | 2 |
| B1c | 0.3 | 0.7 | 0.3 | 0.3 | 2.10 | n.a. |
| E1a | 0.8 | 0.8 | 1.1 | 1.1 | 2 | 3 |
| E1b | 0.8 | 0.8 | 1.1 | 1.1 | 2.66 | 6.5 |
| A2c | 0.4 | 0.9 | 0.8 | 1.1 | 2.67 | n.a. |
| C2d | 0.6 | 1.5 | n.a. | n.a. | 3.45 | n.a. |

Underlined values: not according to the invention.
n.a.: not assessed.

As appearing from table 4, the compositions and annealing conditions have made it possible to manufacture Zn or Zn alloy coated steel sheets with high formability and having a tensile strength of at least 900 MPa in all the cases. However, these sheets do not have the same resistance to LME cracking:

Steel sheets D3, F4, E5 have been manufactured according to the conditions of the invention. Thus, the average contents of C, Mn, Si, and Cr in the zone $D_{100}$ are lowered to such an extent that LME cracking is less likely to occur, even in the conditions of welding at $I_{max}$+10%.

The annealing conditions have created a zone $D_{100}$ with a gradient in Mn and in Si. Table 5 shows also that for these steels, the Mn and Si profiles show that the location of the minimum in Si and in Mn content is more than 1 μm under the Zn coating, and such that $d_{Simin}/(Si_{min}/Si_{nom})>4$ and $d_{Mnmin}/(Mn_{min}/Mn_{nom})>8$. The creation of this zone sufficiently depleted in Si and in Mn, located at a sufficient distance from the Zn coating, makes it possible to improve LME resistance.

In comparison, the annealing conditions of the sheets B1, E1, A2, C2, do not correspond to the invention. Thus, decarburization and composition modifications in Si, Mn, Cr and Al are not sufficient to obtain sufficient LME resistance.

Thus, due to their high mechanical properties and high resistance to LME cracking in resistance spot welding, the high strength steel sheets manufactured according to the invention can be used with profit for the manufacturing of structural parts for automotive vehicles.

What is claimed is:

1. A method for producing a zinc or zinc-alloy coated steel sheet with a tensile strength higher than 900 MPa, for the fabrication of resistance spot welds containing on average not more than two Liquid Metal Embrittlement cracks per weld having a depth of 100 μm or more, comprising the successive steps of:
   providing a cold-rolled steel sheet, a nominal composition of the steel sheet containing, in weight percent:
   $0.07\% \leq C \leq 0.5\%$
   $0.3\% \leq Mn \leq 5\%$
   $0.010\% \leq Al \leq 1\%$
   $0.010\% \leq Si \leq 2.45\%$
   with $0.35\% \leq (Si+Al) \leq 2.5\%$,
   $0.001\% \leq Cr \leq 1.0\%$
   $0.001\% \leq Mo \leq 0.5\%$
   and optionally
   $0.005\% \leq Nb \leq 0.1\%$
   $0.005\% \leq V \leq 0.2\%$
   $0.005\% \leq Ti \leq 0.1\%$
   $0.0001\% \leq B \leq 0.004\%$
   $0.001\% \leq Cu \leq 0.5\%$
   $0.001\% \leq Ni \leq 1.0\%$,
   a remainder being iron and unavoidable impurities from smelting;
   heating said cold-rolled steel sheet up to a temperature T1 between 550° C. and Ac1+50° C. in a furnace zone with an atmosphere (A1) containing from 2 to 15% hydrogen by volume, the balance being nitrogen and unavoidable impurities, so that the iron is not oxidized, then
   adding to the atmosphere (A1) at an injection location in a furnace, at least one element selected from the group consisting of water steam and oxygen with an injection flow rate Q higher than (0.07%/h×α), α being equal to 1 if said element is water steam or equal to 0.52 if said element is oxygen, at a temperature T≥T1, so to obtain an atmosphere (A2) with a dew point DP2 between −15° C. and the temperature Te of the iron/iron oxide equilibrium dew point, wherein the injection flow rate Q is the injected volume of water steam or oxygen per hour divided by the volume of the furnace between the injection location of water steam or oxygen and an end of a section of the furnace heated at a soaking temperature T2;
   heating the sheet from said temperature T1 up to the soaking temperature T2 between 720° C. and 1000° C. in a furnace zone under the atmosphere (A2), wherein the atmosphere (A2) contains nitrogen, from 2 to 15% hydrogen, and more than 0.1% CO by volume, with an oxygen partial pressure higher than $10^{-21}$ atm., wherein the duration to of said heating of the sheet from temperature T1 up to the end of soaking at temperature T2 is between 100 and 500 s;
   soaking the sheet at T2; then
   cooling the sheet at a rate between 10 and 400° C./s; and then
   coating the sheet with zinc or zinc-alloy coating.

2. The method according to claim 1, wherein the dew point DP2 is between −10 and +20° C.

3. The method according to claim 1, wherein the said atmosphere (A2) contains more than 0.2% CO by volume.

4. The method according to claim 1, wherein said temperature T2 is between 750 and 900° C., and wherein the atmosphere (A2) contains between 3 to 5% in volume of H2.

5. The method according to claim 1, wherein after said soaking, the steel sheet is cooled down to a temperature T3 between Ms and Ms+150° C., and maintained at T3 for at least 40 s, so to obtain a Carbide Free Bainite steel sheet.

6. The method according to claim 5, wherein said temperature T3 is between Ms+10° C. and Ms+150° C.

7. The method according to claim 1, wherein after said cooling, the steel sheet is cooled down to a temperature QT between Ms−5° C. and Ms−170° C., optionally held at QT for a duration comprised between 2 and 8 s, then reheated up to a temperature T4 between 350 and 550° C. so to obtained partitioned martensite.

8. The method according to claim 7, wherein the steel sheet is reheated up to the temperature T4 between 350 and 490° C.

9. The method according to claim 1, wherein the steel microstructure contains retained austenite in quantity not more than 20%.

10. The method according to claim 1, wherein said coating is performed by hot-dipping.

11. The method according to claim 1, wherein said coating is performed by electroplating.

12. The method according to claim 1 wherein the impurities include S<0.003%, P<0.02% and N<0.008%.

13. A method for fabrication of structural parts of automotive vehicles comprising performing the method according to claim 1.

* * * * *